(12) United States Patent
Nayshtut et al.

(10) Patent No.: US 12,470,800 B2
(45) Date of Patent: Nov. 11, 2025

(54) METHOD, SYSTEM AND APPARATUS FOR PRIVACY ENHANCEMENT MODE FOR INTEGRATED CAMERAS

(71) Applicant: Intel Corporation, Santa Clara, CA (US)

(72) Inventors: Alex Nayshtut, Gan Yaven (IL); Dan Horovitz, Rishon LeZion (IL); Omer Ben-Shalom, Rishon Le-Tzion (IL); Guy Ben-Artzi, Zichron Yaacov (IL); Miriam Engel, Santa Clara, CA (US); Victoria Almog-Ayzenberg, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 17/843,894

(22) Filed: Jun. 17, 2022

(65) Prior Publication Data
US 2022/0321771 A1 Oct. 6, 2022

(51) Int. Cl.
*H04N 23/61* (2023.01)
*G06F 3/01* (2006.01)
*G06F 21/83* (2013.01)
*H04N 23/667* (2023.01)

(52) U.S. Cl.
CPC ............ *H04N 23/61* (2023.01); *G06F 3/016* (2013.01); *G06F 21/83* (2013.01); *H04N 23/667* (2023.01); *G06F 2221/2105* (2013.01)

(58) Field of Classification Search
CPC ...... H04N 23/61; H04N 23/667; G06F 3/016; G06F 21/83
See application file for complete search history.

(56) References Cited

U.S. PATENT DOCUMENTS

| | | | | |
|---|---|---|---|---|
| 8,761,448 | B1 * | 6/2014 | Burr | G06F 3/0304 382/165 |
| 8,862,104 | B2 * | 10/2014 | Mian | H04M 1/72448 345/169 |
| 9,100,544 | B2 * | 8/2015 | Cain | H04N 7/15 |
| 10,043,066 | B2 * | 8/2018 | Lawrence | H04N 7/147 |
| 2004/0257431 | A1 * | 12/2004 | Girish | H04N 21/43632 348/E7.079 |
| 2014/0037134 | A1 * | 2/2014 | Tong | G06V 40/161 382/103 |
| 2014/0090074 | A1 * | 3/2014 | Bar-On | G06F 21/6245 726/26 |
| 2016/0080651 | A1 * | 3/2016 | Yokomitsu | H04N 23/65 386/226 |

(Continued)

*Primary Examiner* — Olisa Anwah
(74) *Attorney, Agent, or Firm* — Hanley, Flight & Zimmerman, LLC (57) ABSTRACT

The disclosure generally relates to method, system and apparatus for privacy enhancement mode for integrated cameras. In an exemplary embodiment, the disclosure allows a user of a device equipped with an integrated device to engage the device in the so-called privacy mode whereby while the camera is engaged, the device does not broadcast the user's images; rather the device uses the camera to detect, discern and determine the user's attributes. Such attributes may include one or more of movement, motion, mood, gesture and temperature of the user. The attributes may include specificities of the user's environment.

27 Claims, 6 Drawing Sheets

(56) References Cited

U.S. PATENT DOCUMENTS

| | | | |
|---|---|---|---|
| 2016/0105598 A1* | 4/2016 | Zeira | H04N 23/51 |
| | | | 348/143 |
| 2016/0226917 A1* | 8/2016 | Plagemann | G06F 21/82 |
| 2018/0088952 A1* | 3/2018 | Cocco | G06T 1/20 |
| 2021/0397751 A1* | 12/2021 | Iyer | G06F 3/04842 |
| 2022/0398905 A1* | 12/2022 | Yang | G06F 3/147 |

* cited by examiner

METHOD, SYSTEM AND APPARATUS FOR PRIVACY ENHANCEMENT MODE FOR INTEGRATED CAMERAS

FIELD

The disclosure generally relates to method, system and apparatus for privacy enhancement mode for a smart device having an integrated camera. In one embodiment, the disclosure provides method, system and apparatus to identify and implement user's preferences in whether to broadcast a video stream from the user's platform. If the user decides not to broadcast video, the camera may still remain engaged but only to extract user attribute information which is not broadcast.

BACKGROUND

Video conferencing has been in ever-increase demand. With the rise of online video collaboration and constant increase in network bandwidth, video cameras are a regular part of every smart computing device including mobile devices, laptops and even desktop monitors. The recent generation of camera-based improvements provide additional services such as user's ergonomic optimization, wellness assessments, gesture recognition and situation recognition, to name a few.

Users may not feel comfortable in front of camera-equipped devices as the ubiquitous camera raises privacy concerns. For example, the camera may actively record the user and upload the video footage to the cloud without the user's knowledge or acquiescence. Increasingly, malicious actors take control of the camera-equipped device and manipulate the camera settings in order to hijack the device and record the user. Conventional solutions rely on turning the camera off with a physical shutter. In addition, modern cameras include a Light Emitting Diode (LED) to indicate active recording. The shutter blocks the camera from supporting use cases that do not require video uploading and the LED indicators are bullion (ON/OFF indication)—they do not show what the camera is doing. Thus, there is a need for a method, system and apparatus to enhance privacy protection of integrated cameras.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, numerous specific details are set forth in order to provide a thorough understanding of various embodiments. However, various embodiments may be practiced without the specific details. In other instances, well known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various labels may be used in describing particular devices, software, functions, etc. These are used for simplicity and convenience, but this should not be interpreted to mean that only items with those labels are covered by the description. Devices, software, functions, etc., that perform in the same manner as the described items, but are labeled with different terminology, should be considered to be equivalent to the described items.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used within this document, the term "communicate" is intended to include transmitting and/or receiving. This may be particularly useful in claims when describing the organization of data that is being transmitted by one device and received by another, but only the functionality of one of those devices is required to infringe the claim. Similarly, the exchange of data between a network controller and a mobile device (both devices transmit and receive during the exchange) may be described as 'communicating', when only the functionality of one of those devices is being claimed.

In certain embodiments, the disclosure relates to method, system and apparatus for privacy enhancement mode for integrated cameras. In an exemplary embodiment, the disclosure allows a user of a device equipped with an integrated device to engage the device in the so-called privacy mode whereby, optionally, while the camera is engaged, the device does not broadcast the user's images. Rather, the device uses the camera to detect, discern and determine one or more user attributes. Such attributes may include movement, motion, mood, gesture, temperature or other physical or biological indications of the user. The attributes may also include specificities (e.g., ambient temperature, lighting or other visual ques) of the user's environment. An inference engine configured with a convolutional network may implement the requisite artificial intelligence (AI) to determine these attributes. The user attributes may be used by a processor network (e.g., software driver) to render certain conclusions without broadcasting the user's images.

Figure 1:
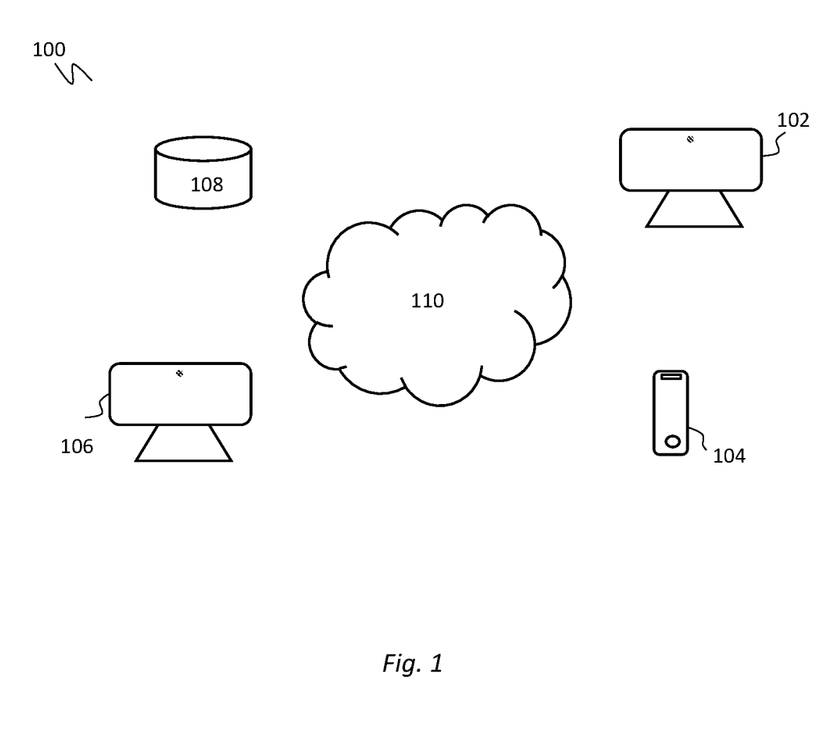
FIG. 1 is an exemplary environment for implementing an embodiment of the disclosure.

FIG. 1 is an exemplary environment for implementing an embodiment of the disclosure. Specifically, FIG. 1 illustrates computing environment 100 with end-user devices 102, 104 and 106. End-user devices may comprise one or more of smartphones, tablets, laptops, desktop computing devices or any other device with capability to capture and transmit images. In one exemplary embodiment, the user device may comprise a security camera. User devices may also include Internet-of-Things (IoT) to the extent that such devices are equipped with a camera or other recording means. User devices 102, 104 and 106 communicate with each other through cloud or fog 110. Cloud system 110 may comprise an architecture configured to support digital (e.g., online) communication. Could 110 may communicate with server 108. Server 108 may comprise circuitry to receive and store information. For example, server 108 may comprise a storage system to receive data from one or more user device through cloud 110. The received data may comprise user images, for example, video recording (or images captured) of a user engaged with a respective user device.

Conventional camera technologies have a few drawbacks. For example, the device cameras may be actively recording the user even without the user's knowledge or acquiescence. That is, when turning the camera-equipped device ON, the user has no way of knowing whether the video is or will be engaged and whether images will be recorded, stored or uploaded for later exploitation.

Among others, the disclosed embodiments allow the device camera to be used for different purposes simultaneously: a traditional video/photo acquisition and as a sensing device for inferential use (i.e., to infer certain user action/inaction or affect).

In certain embodiments, the disclosure increases user privacy by providing user-controlled means to control a device's (camera) broadcast. In one embodiment, privacy enhancement allows the dual use of the camera. The dual uses may include Privacy Camera Mode (PCM) and Broadcast Camera Mode (BCM).

Among others, the PCM allows the local use of the camera footage while blocking a video transfer. That is, the PCM may be used to engage the camera to detect user's movement, motion, gesture or mood. The camera may be integrated with a device, such as smartphone, tablet, laptop, etc. Movement may include the user's motion relative to the camera or movement in general. Motion may include the user's active motion, such as walking with the camera's purview. Gestures may include the user's had or facial gestures (e.g., waiving or frowning). Mood may detect and discern human emotions such as laughter, sadness enthusiasm, energy or lethargy. While in PCM, the camera (and any hardware, software and/or firmware) associate with the device will be engaged to detect the user's movement, motion, gesture, or mood. This information may be used to make the aforementioned inferences. The inferences may be used at an Artificial Intelligence (AI) system to reach a conclusion as to the user's state and take further action. The camera will use this information for internal processing and will not broadcast the information.

In one implementation, in PMC mode the camera blocks the data pipe (which may be a video stream) form going to the system memory and instead routes it only to the Local Inference Subsystem (LIS). The channel to and from the LIS may be throttled to limit the bandwidth specifically to the data size required for inference and output. Additionally, the pipeline may be available only to a separate processing system (e.g., off camera) for implementing the AI required for the inference determination. Thus, processing may not be limited to LIS only and post-processing inferences may be implemented on another subsystem of the camera.

To attest to the users that user privacy is preserved, the system may display an indication of the camera operation state (PMC or Broadcast modes). In one embodiment this is implemented with an LED color (e.g., in additional to the existing white LED) that will light when the memory data pipe (i.e., video stream directed to the memory) is powered off. It should be noted that this implementation is exemplary and other ways of communicating the privacy mode are possible without departing from the disclosed principles. With the camera's privacy mode, a user may enjoy the camera being used as a sensor for the new use cases while still maintaining user privacy. This application also attests to the user that user data is not leaked to the cloud or used for unintended purposes. In certain disclosed embodiments, the architecture enforces privacy with protection at the hardware layer such that the only data exposed from the camera in the PMC mode is the inferred data.

Figure 2:
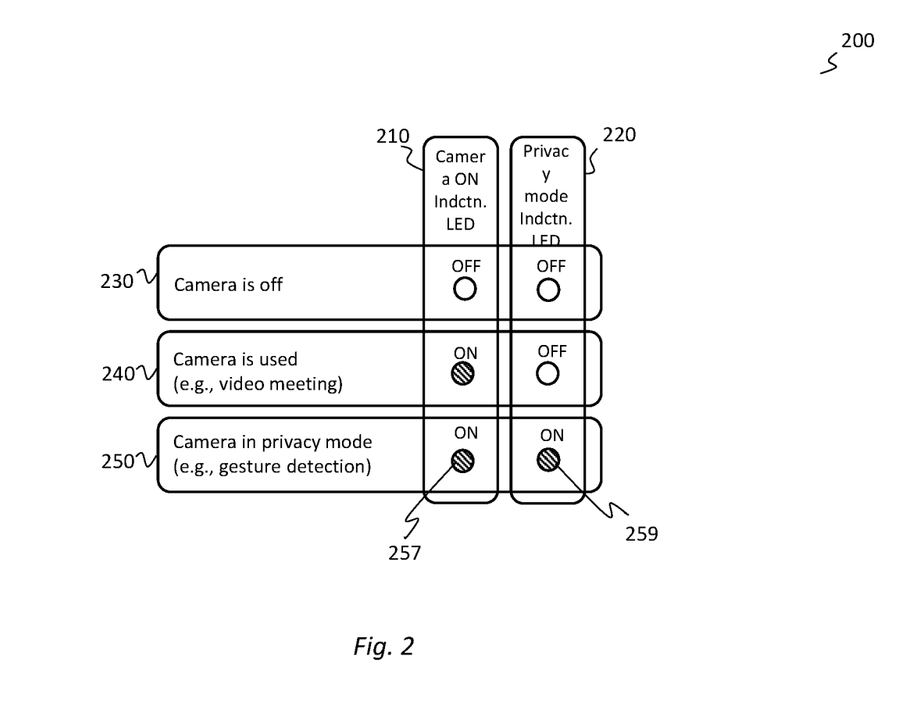
FIG. 2 is a state machine representation of an exemplary architecture according to one embodiment of the disclosure.

FIG. 2 is a state machine representation of an exemplary architecture according to one embodiment of the disclosure. The state machine of FIG. 2 may be used, for example, for computer vision at hardware level. The user indicator can verify whether the video steam pipe is off which prevents transmission of image data to the internet.

System 200 of FIG. 2 shows three modes 230 (camera OFF), 240 (Camera in use) and 250 (Camera in privacy mode for gesture detection). For each of the three modes, there is an indication light corresponding to when the camera is ON (210) and when the camera is in privacy mode (220). The indication light may comprise a light emitting diode (LED). The LED indicator may be integrated with the device camera. By way of example, in the representation of FIG. 2, the camera is ON 240 and in use as indicated by the corresponding LED indicator 210. This could be a condition, for example, when the user is attending a live online meeting.

When the camera is in privacy mode, the camera detects the user's presence and various attributes as discussed above (i.e., movement, motion, gesture, temperature, mood, etc.) and the system does not stream images from the camera. In this manner, the camera acts as a sensor. This is schematically illustrated in the state machine 200 as both of the LED indicators are ON at privacy mode 250.

In one exemplary embodiment, the disclosure includes the following components and actions. An exemplary processing system integrates a selector switch (not shown) that will either power the privacy LED in PCM or will switch off in other use cases. That is, the LEDs may be driven by the hardware logic. The hardware logic's inputs are tied to a power rail of the camera subsystem (i.e., the hardware-driven method), rather than the General-Purpose Input/Output (GPIO) which is a software-driven subsystem. This prevents potential for a malicious alteration. The sensor part of the camera is always ON and is only used for sensing user attributes discussed above.

An exemplary system that implements the disclosed embodiments may comprise the following components:

Privacy Inference Engine (PIE)—is used to interpret a video frame's content (e.g., gesture detection) but does not share image information out of its boundary (i.e., does not share the image outside of the camera domain). This is illustrated and discussed below as interface engine 360 in FIG. 3.

Privacy indication logic—is used to drive the Privacy Mode Indicator (250, FIG. 2) when the video stream is only used by the PIE and the video stream is kept in the Camera domain only. This is illustrated by LED ON at states 257 and 259 of FIG. 2.

Figure 3:
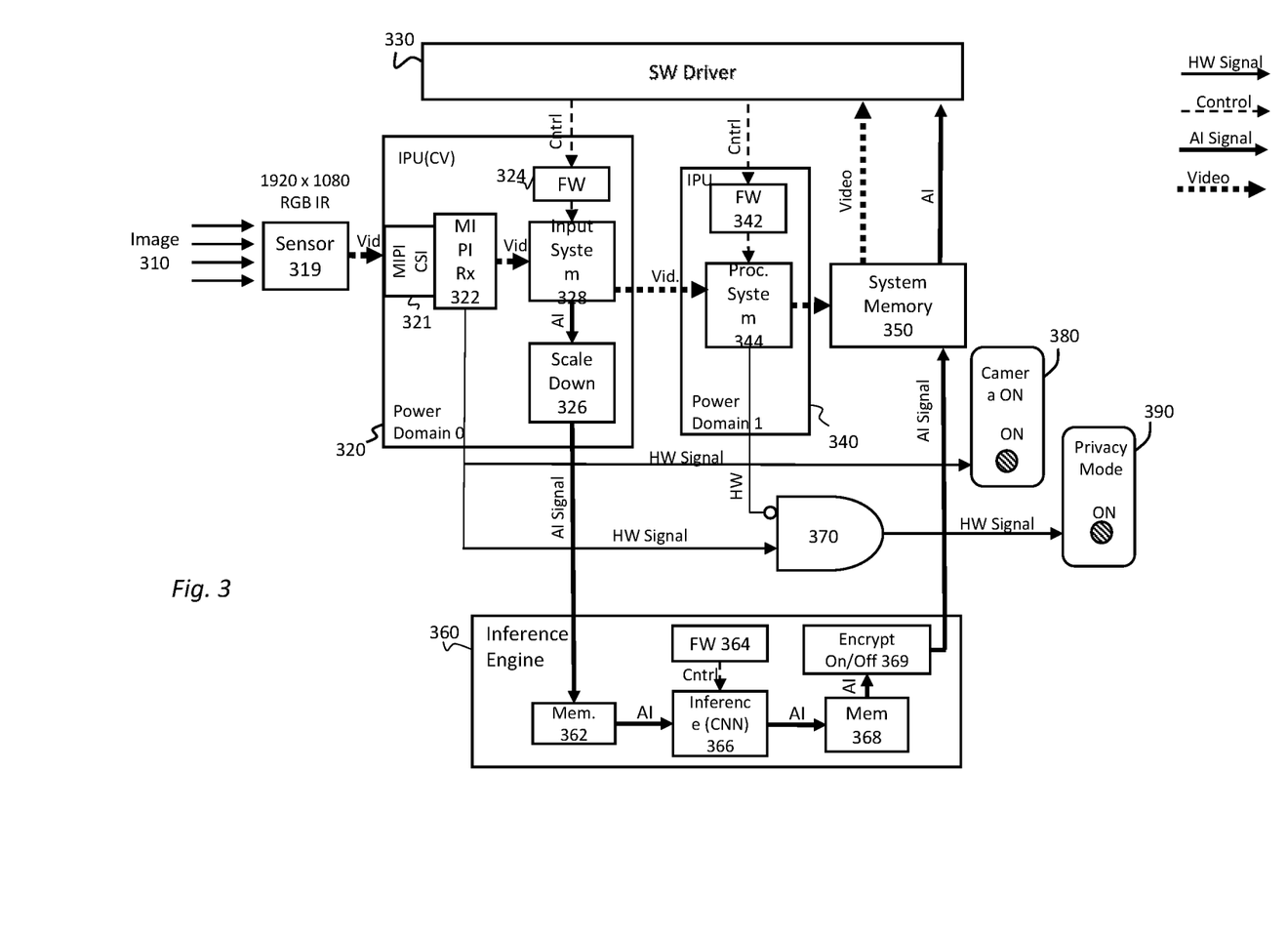
FIG. 3 illustrates an exemplary system according to one embodiment of the disclosure.

Privacy protected mode indicator and logic—is a hardware-based indicator and logic (i.e., software cannot overwrite it). This system and logic ensures that the video stream is not used by the IPU 340 (and Processing System 344) and is not routed to the memory 350 This drives an LED whenever the video stream is used by the PIE only.

While FIG. 2 illustrates different LEDs for different states, in other embodiments a single light may be used to blink when only sensing is taking place. The blinking LED may show a constant color when video is being sent out of the system. In still another embodiment, a single LED indicator may be used with different color lights to indicate the different modes.

FIG. 3 illustrates an exemplary system according to one embodiment of the disclosure. The system of FIG. 3 may be implemented on an integrated circuit, for example, on a System-on-Chip (SoC). The system of FIG. 3 may be implemented with hardware, software or a combination of hardware and software (i.e., firmware). The system of FIG. 3 may comprise one or more logics to receive camera images and implement the different modes discussed in relation to FIG. 2.

The components of FIG. 3 include image processing unit for computer vision (IPU-CV) 320, image processing unit 340, system memory 350, software driver 330, camera indicator 380 and privacy mode indicator 390, logical gate 370 and inference engine 360. Operation of each component is described below in reference to FIG. 3.

Exemplary image 330 may be received by a sensor 319. The sensor 319 may comprise conventional photodiodes. In an exemplary embodiment, sensor 319 may comprise 1920× 1080 pixel Red Green Blue-Infrared (RGB-IR) sensor (and filter combination). In an RGB-IR, a green spot in the standard Bayer Color Filter Array (CFA) is substituted with a spot which admits the Near-Infrared (NIR) wavelength to reach the sensor.

Next, IPU-CV 320 receives image data from sensor 319. IPU-CV 320 includes Mobile Industry Processor Interface (MIPI) receiver (Rx) 322. MIPI receiver 322 may include MIPI Camera Serial Interface (MIPI CSI) 321 which defines an interface between a camera and a host processor. The received image 330 is digitized at input system 328 and scaled down at processor and logic 326. The output of MIPI receiver 322 is a video signal which is received at input system 328. Input system 328 may comprise an actual or a physical processor (or a combination of both). Input system 328 also receives one or more control signals from software driver 330 through firmware 324. Software driver 330 may comprise one or more of hardware, software or a combination of hardware and software. In one embodiment, software driver 330 comprises a processor circuitry (not shown) which may optionally communicate with a memory circuitry (not shown). The control signal from software driver 330 may dictate the processing parameters to IPU-CV 320. The output of system processor 328 may be an Artificial Intelligence (AI) signal which can be routed to scale-down processor 326, and once processed, to inference engine 360. The AI signal from IPU-CV may include user attributes (e.g., motion, mood, gesture, temperature, movement, etc.)

Software driver 330 communicates logic to IPU-CV 320 and IPU 340. Software driver 330 also receives, as inputs, video images and AI information from system memory (330) and inference engine 360 as described below The information is used by software driver 330 to drive the necessary logic to IPUs 320 and 340. Software driver 330 may comprise a controller (not shown) that determines whether to send out indication (from IPU-CV 320) or an image (IPU 340).

IPU 340 receive a video signal from IPU-CV 330 under control of software driver 330. IPU 340 includes, among others, firmware 342 and processing system (processor) 344. Processing system 344 receives video signal from input system 328 and control signal from software driver 330 (through interface firmware 342). The outputs of IPU 340 include a video signal (e.g., video stream of the image 310) as well as hardware signals. The hardware signals are directed to logic gate 370 and indicator 380. Indicator 380 may comprise an LED indicator that, upon receipt of the HW signal from IPU 320, indicates that the camera is ON. The HW signal received from IPU 340 at logic gate 370 may be used to determine whether to turn ON the privacy mode indicator 390. In determining whether to turn the privacy mode indicator 390, logic gate 370 also considers a hardware signa received from MIPI Rx 322. This information is used according to the programmed logic to determine whether to turn the privacy mode indicator 390 ON.

With respect to LED 380, it should be notes that the line that drives the "Camera ON" LED is from the IPU (CV) 320 power line. Once LED 380 it ON the, Camera On indication LED is ON and visible to the user. The Privacy mode indicator LED 390 turns ON only if the IPU (CV) is ON and the IPU 340 Processing-System is OFF.

Interference engine 360 may be configured to run a convolutional network to, among others, implement AI processing. In one embodiment, interference engine 360 may comprise components configure to make a local inference by transforming information from the image domain to other domains. In one embodiment, interference engine 360 receives processed image information from image 310 and discerns attribute information from the received information. By way of example, interference engine 360 may receive image data from IPU-CV 320 and discern or determine user attribute information including, movement, motion (e.g., hand motion), mood (smile, happiness, sadness, anger), facial or hand gestures and user biometrics (skin temperature, color, pulse, pupil dilation, etc.).

The exemplary interference engine 360 comprises local memory 362, firmware 366, inference convolutional neural network (CNN) 366, local memory 368 and encryption logic 369. Encryption logic 369 may optionally be enabled or disabled depending on the user's preferences. In an exemplary implementation, interference engine 360 receives AI signal from IPU-CV 320. The received information may be stored at local memory 362. Inference CNN 366 communicates receives firmware 364 instructions for processing AI data stored in memory 362. This data is then processed according to the received instructions to determine and extract user's attributes of interest. Inference CNN may be part of a larger AI processing system (not shown) whereby the convolutional neural network is continually trained to obtain desired data sets.

The attribute data determined by inference CNN 366 is then directed to local memory 360. It should be noted that local memories 362 and 368 may act as data buffers and may be optionally required or used. Memory 368 may optionally direct the stored data to encryption engine 369. Encryption engine may be activated by the user to further encrypt user attribute data. The data is then relayed to system memory 350, and ultimately, to SW driver 330 as AI signal. SW driver 330 uses the user attribute information to engage and drive one or more of IPU-CV 320 and IPU 340, depending on the user's privacy mode selection.

Figure 4:
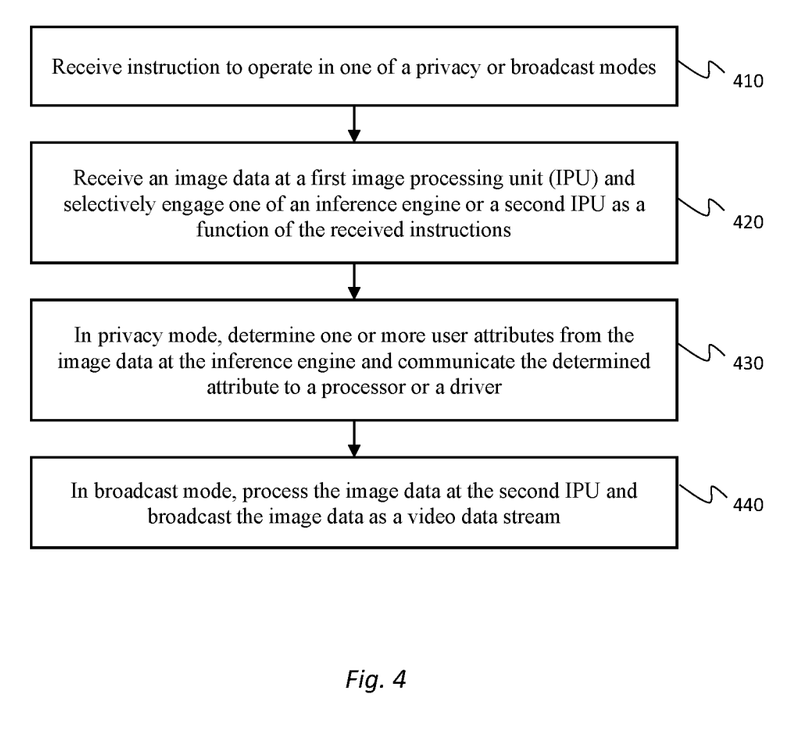
FIG. 4 is an exemplary flow diagram for implementing a process according to one embodiment of the disclosure.

FIG. 4 is an exemplary flow diagram for implementing a process according to one embodiment of the disclosure. The flow diagram of FIG. 4 maybe implemented at hardware, software or a combination of hardware and software (e.g., firmware). In an exemplary embodiment, the flow diagram of FIG. 4 is implemented at processor circuitry (not shown) in communication with a memory circuitry (not shown). In another exemplary embodiment, the flow diagram of FIG. 4 is implemented at part or all of the system of FIG. 3.

At step 410 of FIG. 4, the system receives instructions to operate in one of a privacy or broadcast modes. The instructions maybe be issued by the user communicating with the device. For example, the device having an integrated camera may receive such user instructions from a dialog or through a switch accessible to the user. The device may provide haptic feedback to acknowledge receipt of the user's instructions.

At step 420, the system receives an image data from the user. This may be received at a sensor integrated with the user's device. As stated, the image may be processed and relayed to the first IPU. Depending on the user's selection of the active mode (i.e., broadcast or privacy mode), the system may then selectively engage one of an inference engine or a second IPU for further action. The image may be processed by the first IPU to obtain appropriate image data. The processing may be in line with the user's selected mode such that further processing is made possible.

If the user selects the privacy mode, at step 430, the system determines one or more user attributes from the image data. This may be implemented at the inference engine and the resulting attributes may be communicated to a processor or a driver for further action. The inference engine may comprise hardware and software to implement convolutional neural network algorithm to discern, depict and determine various user attributes from the image data. In addition, the system may display the privacy mode indication by turning on an LED notifier or by engaging in other notification means (e.g., flashing light or playing a specific chime or tone).

If the user selects the broadcast mode, at step 430, the image data is transmitted from the first IPU to the second IPU to further process (as needed) and broadcast the image data as video stream. The system may also display an indication to the user to acknowledge that the camera is actively recording and broadcasting. The indication may include visual or audio indicators to remind the user that the camera is actively broadcasting.

A gate logic (379, FIG. 3) may be used to determine which (one or both) indicator should be engaged. The gate logic may communicate the first and second IPUs during the determination process.

In the foregoing embodiments, it should be noted that each of the software driver, inference engine, computer vision image processing unit, camera indicator and gate logic may comprise one or more processing circuitry with associate memory circuitry and software required to execute some or all of the respective functions. Thus, for example, gate logic may comprise hardware (processor and memory circuitries). The memory circuitry may comprise software to contain instructions executable on the processor circuitries to execute the function of the gate logic.

Figure 5:
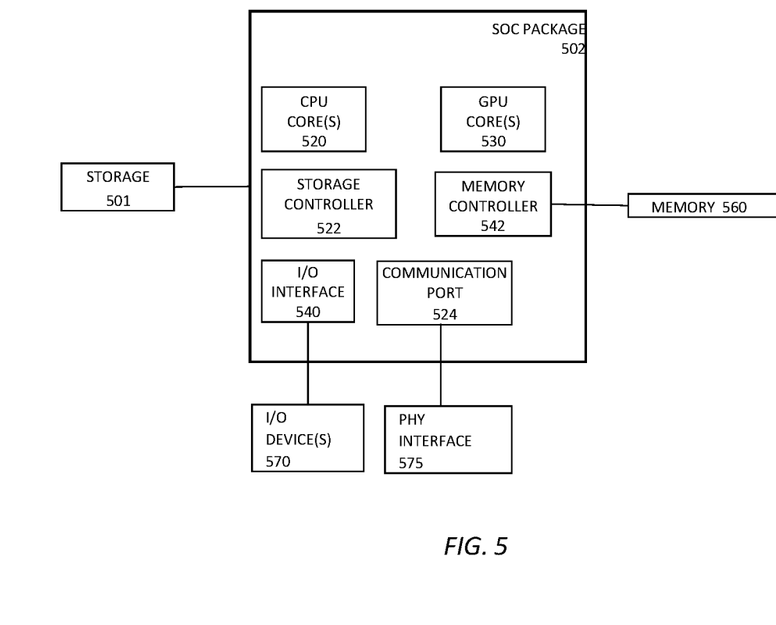
FIG. 5 illustrates a block diagram of a System-On-Chip (SoC) package in accordance with an embodiment.

As stated, an exemplary system may be integrated on an SoC. FIG. 5 illustrates a block diagram of an SoC package for executing the security pipeline in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. SOC Package 502 communicates with storage circuitry 501. Storage circuitry 501 may comprise conventional memory for storing instructions. In an exemplary embodiment, storage 501 communicates with storage controller 522 which implement the stored instructions at SOC 502. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device (s) 570 may include one or more of a keyboard, a mouse, a touchpad, a display, an image/video capture device (such as a camera or camcorder/video recorder), a touch screen, a speaker, or the like. Communication port 524 communicates with PHY interface 575 which may define an ethernet port.

Figure 6:
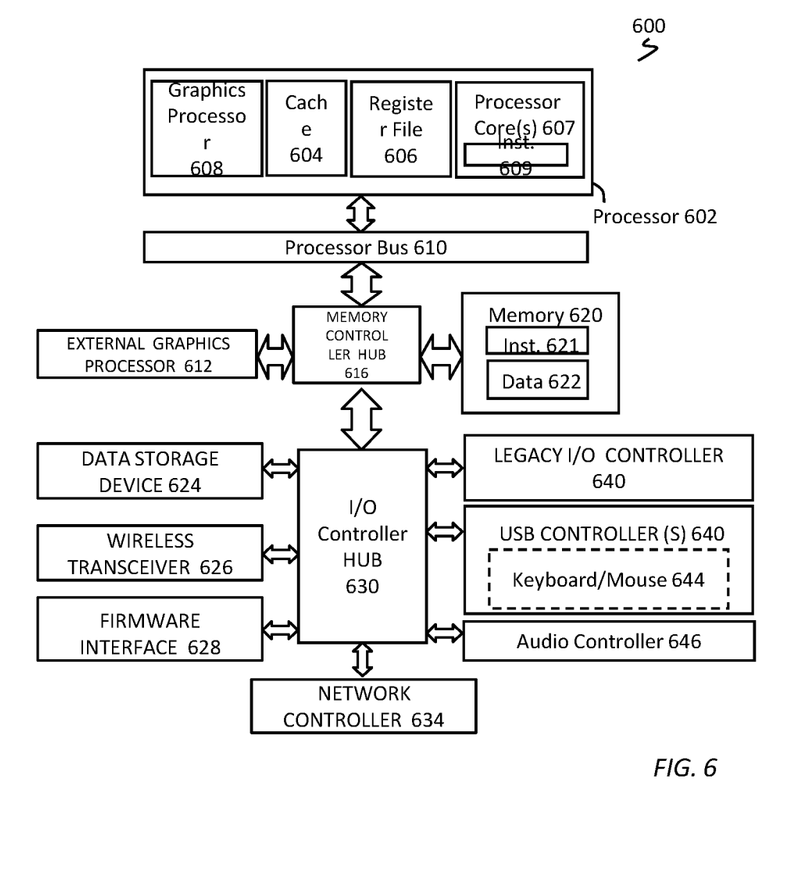
FIG. 6 is a block diagram of a processing system according to an embodiment of the disclosure.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608. In another embodiment, the disclosed embodiments define a server in a data center.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Example 1 relates to a system comprising: a first image processing unit (IPU) to receive an image data from a camera; a second IPU in communication with the first IPU; an inference engine circuitry in communication with the first IPU, the inference engine configured to receive the image data from the first IPU and determine one or more user attributes from the image data; and a software driver circuitry in communication with the first IPU and the second IPU, the software driver circuitry configured to selectively engage the system to operate in one of a privacy mode or a broadcast mode; wherein, in the privacy mode, the software driver circuitry directs the first IPU to communicate the image data to the inference engine circuitry and wherein the inference engine circuitry determines at least one user attribute from the image data; and wherein, in the broadcast mode, the second IPU is configured to process the image received from the first IPU to broadcast a video data stream.

Example 2 relates to the system of example 1, wherein the software driver circuitry directs the first IPU to communicate the image data exclusively to the inference engine circuitry in the privacy mode.

Example 3 relates to the system of example 1, wherein the software driver circuitry directs the first IPU to communicate image data with the second IPU in the broadcast mode.

Example 4 relates to the system of example 1, further comprising a gate logic circuitry, a camera mode indicator circuitry and a privacy mode indicator circuitry.

Example 5 relates to the system of example 4, wherein the gate logic circuitry engages the privacy mode indicator circuitry when in the privacy mode.

Example 6 relates to the system of example 4, wherein the second IPU engages both the camera indicator circuitry and the privacy indicator circuitry when in the broadcast mode.

Example 7 relates to the system of example 1, wherein the first image processing unit comprises a computer vision image processing unit (CV-IPU).

Example 8 relates to the system of example 1, wherein user attributes comprise one or more of movement, motion, mood, gesture and temperature relating to a user.

Example 9 relates to the system of example 1, wherein in the privacy mode no image is broadcast and user attributes are communicated to the software driver.

Example 10 relates to a non-transitory computer-readable medium comprising a processor circuitry and a memory circuitry in communication with the processor circuitry and including instructions to protect user privacy at a camera, the memory circuitry further comprising instructions to cause the processor to: receive an instruction to operate the device in one of a privacy or broadcast modes; receive an image data at a first image processing unit (IPU) and selectively engage one of an inference engine or a second IPU as a function of the instructions; in privacy mode, determine one or more user attributes from the image data at the inference engine and communicating the determined attribute to a driver; and in broadcast mode, process the image data at the second IPU and broadcast the image data as a video data stream; wherein in the privacy mode no image is broadcast and the one or more user attribute is communicated to the driver.

Example 11 relates to the medium of example 10, wherein the instructions further cause the processor to exclusively communicate the image data to the inference engine when in the privacy mode.

Example 12 relates to the medium of example 10, wherein the instructions further cause the processor to communicate the image data from the first IPU to the second IPU when in the broadcast mode.

Example 13 relates to the medium of example 12, wherein the instructions further cause the processor to communicate the image data from the first IPU to the second IPU and to the inference engine when in the broadcast mode.

Example 14 relates to the medium of example 10, wherein the instructions further cause the processor to communicate privacy mode engagement by activating a privacy mode indicator.

Example 15 relates to the medium of example 10, wherein the instructions further cause the processor to communicate broadcast mode engagement by activating a camera mode indicator.

Example 16 relates to the medium of example 15, wherein the instructions further cause the processor to activate both the camera mode indicator and a privacy mode indicator when in the privacy mode.

Example 17 relates to the medium of example 10, wherein the first image processing unit comprises a computer vision image processing unit (CV-IPU).

Example 18 relates to the medium of example 10, wherein user attributes comprise one or more of movement, motion, mood, gesture and temperature relating to a user.

Example 19 relates to a method to enhance user privacy of a device having an integrated camera, comprising: receiving an instruction to operate the device in one of a privacy or broadcast modes; receiving an image data at a first image processing unit (IPU) and selectively engaging one of an inference engine or a second IPU as a function of the instructions; in privacy mode, determining one or more user attributes from the image data at the inference engine and communicating the determined attribute to a driver; and in broadcast mode, processing the image data at the second IPU and broadcasting the image data as a video data stream; wherein in the privacy mode no image is broadcast and the one or more user attribute is communicated to the driver.

Example 20 relates to the method of example 19, further comprising exclusively communicating the image data to the inference engine when in the privacy mode.

Example 21 relates to the method of example 19, further comprising communicating the image data from the first IPU to the second IPU when in the broadcast mode.

Example 22 relates to the method of example 21, further comprising communicating the image data from the first IPU to the second IPU and to the inference engine when in broadcast mode.

Example 23 relates to the method of example 19, further comprising communicating privacy mode engagement by activating a privacy mode indicator.

Example 24 relates to the method of example 19, further comprising communicating broadcast mode engagement by activating a camera mode indicator.

Example 25 relates to the method of example 24, further comprising activating both the camera mode indicator and a privacy mode indicator when in the privacy mode.

Example 26 relates to the method of example 19, wherein the first image processing unit comprises a computer vision image processing unit (CV-IPU).

Example 27 relates to the method of example 19, wherein user attributes comprise one or more of movement, motion, mood, gesture and temperature relating to a user.

While the principles of the disclosure have been illustrated in relation to the exemplary embodiments shown herein, the principles of the disclosure are not limited thereto and include any modification, variation or permutation thereof.

What is claimed is:

1. A system comprising:
   first circuitry to communicate with a camera, the first circuitry to obtain image data from the camera, the first circuitry associated with a first power domain;
   second circuitry in communication with the first circuitry, the second circuitry to access the image data from the first circuitry and generate output data based on the image data, the second circuitry associated with a second power domain different from the first power domain;
   third circuitry coupled to a first power line associated with the first circuitry, a second power line associated with the second circuitry, and a privacy mode indicator, the third circuitry to activate the privacy mode indicator based on the first power line and the second power line; instructions; and processor circuitry to be programmed based on the instructions to:

obtain a selection to cause the system to operate in one of a privacy mode or a broadcast mode; and cause the second power line associated with the second circuitry to be powered on or powered off based on the selection.

2. The system of claim 1, including inference engine circuitry in communication with the first circuitry, the inference engine circuitry to obtain the image data from the first circuitry and determine one or more user attributes from the image data, wherein the processor circuitry is to direct the first circuitry to communicate the image data exclusively to the inference engine circuitry in the privacy mode.

3. The system of claim 1, wherein the processor circuitry is to direct the first circuitry to communicate the image data to the second circuitry in the broadcast mode.

4. The system of claim 1, wherein the third circuitry is to engage the privacy mode indicator when the system is in the privacy mode.

5. The system of claim 1, including a camera indicator, wherein the the third circuitry is to engage both the camera indicator and the privacy mode indicator when the system is in the privacy mode.

6. The system of claim 1, wherein the first circuitry includes a computer vision image processing unit (CV-IPU).

7. The system of claim 2, wherein the one or more user attributes include at least one of movement, motion, mood, gesture or temperature relating to a user.

8. The system of claim 2, wherein when the system is in the privacy mode, the processor circuitry is to:

cause the second power line to be powered off to cause no image to be broadcast by the second circuitry; and access the one or more user attributes from the inference engine circuitry.

9. A non-transitory computer-readable medium comprising instructions to cause processor circuitry of a device to at least:

obtain a selection instruction to operate the device in one of a privacy mode or a broadcast mode;

cause first circuitry associated with a first power domain to obtain image data and selectively engage second circuitry based on the selection instruction, the second circuitry, when engaged, to access the image data from the first circuitry and generate output data based on the image data, the second circuitry associated with a second power domain different from the first power domain, a power line associated with the second circuitry to be coupled to third circuitry, the third circuitry to activate a privacy mode indicator based on the power line; and in the privacy mode, cause the power line associated with the second circuitry to be powered off.

10. The non-transitory computer-readable medium of claim 9, wherein the instructions are to cause the processor circuitry to:

selectively engage inference engine circuitry based on the selection instruction, the inference engine circuitry to obtain the image data from the first circuitry and determine one or more user attributes from the image data, and cause the first circuitry to exclusively communicate the image data to the inference engine circuitry when the selection instruction corresponds to the privacy mode.

11. The non-transitory computer-readable medium of claim 9, wherein the instructions are to cause the processor circuitry to cause the first circuitry to communicate the image data to the second circuitry when the selection instruction corresponds to the broadcast mode.

12. The non-transitory computer-readable medium of claim 10, wherein the instructions are to cause the processor circuitry to cause the first circuitry to communicate the image data to the second circuitry and to the inference engine circuitry when the selection instruction corresponds to the broadcast mode.

13. The non-transitory computer-readable medium of claim 9, wherein the instructions are to cause the processor circuitry to cause the power line associated with the second circuitry to be power off based on the selection instruction corresponding to the privacy mode, the third circuitry to activate the privacy mode indicator based on the power line being powered off.

14. The non-transitory computer-readable medium of claim 9, wherein the instructions are to cause the processor circuitry to communicate broadcast mode engagement based on activation of a camera mode indicator.

15. The non-transitory computer-readable medium of claim 14, wherein the instructions are to cause the processor circuitry to cause both the camera mode indicator and the privacy mode indicator to be activated based on the selection instruction corresponding to the privacy mode.

16. The non-transitory computer-readable medium of claim 9, wherein the first circuitry includes a computer vision image processing unit (CV-IPU).

17. The non-transitory computer-readable medium of claim 10, wherein the one or more user attributes include at least one of movement, motion, mood, gesture or temperature relating to a user.

18. A method comprising:

obtaining a selection instruction to operate a device in one of a privacy mode or a broadcast mode;

obtaining image data at first circuitry associated with a first power domain;

selectively engaging second circuitry based on the selection instruction, the second circuitry, when engaged, to access the image data from the first circuitry and generate output data based on the image data, the second circuitry associated with a second power domain different from the first power domain, a power line associated with the second circuitry coupled to third circuitry, the third circuitry to activate a privacy mode indicator based on the power line; and in privacy mode, cause the power line associated with the second circuitry to be powered off.

19. The method of claim 18, including:

selectively engaging inference engine circuitry based on the selection instruction, the inference engine circuitry to obtain the image data from the first circuitry and determine one or more user attributes from the image data, and exclusively communicating the image data from the first circuitry to the inference engine circuitry when the selection instruction corresponds to the privacy mode.

20. The method of claim 18, including communicating the image data from the first circuitry to the second circuitry when the selection instruction corresponds to the broadcast mode.

21. The method of claim 19, including communicating the image data from the first circuitry to the second circuitry and from the first circuitry to the inference engine circuitry when the selection instruction corresponds to broadcast mode.

22. The method of claim 18, including communicating privacy mode engagement by activating the privacy mode indicator.

23. The method of claim 18, including communicating broadcast mode engagement by activating a camera mode indicator.

24. The method of claim 23, including activating both the camera mode indicator and the privacy mode indicator when the selection instruction corresponds to the privacy mode.

25. The method of claim 18, wherein the first circuitry includes a computer vision image processing unit (CV-IPU).

26. The method of claim 19, wherein the one or more user attributes include at least one of movement, motion, mood, gesture or temperature relating to a user.

27. The system of claim 1, wherein the third circuitry is to activate the privacy mode indicator based on the first power line being power on and the second power line being power off.

\* \* \* \* \*